US012659310B2

(12) United States Patent (10) Patent No.: US 12,659,310 B2
Roy et al. (45) Date of Patent: Jun. 16, 2026

(54) CROSS-DOMAIN DATA BLOB RETRIEVAL FOR ON-PREMISES NETWORKS

(71) Applicant: Arista Networks, Inc., Santa Clara, CA (US)

(72) Inventors: Arup Raton Roy, Burnaby (CA); Ryan Izard, Seneca, SC (US); Kanzhe Jiang, Los Altos Hills, CA (US); Muhannad Alabwah, Burnaby (CA); Vincent Lam, New Westminster (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 96 days.

(21) Appl. No.: 18/612,769

(22) Filed: Mar. 21, 2024

(65) Prior Publication Data

US 2025/0300978 A1 Sep. 25, 2025

(51) Int. Cl.
*H04L 9/40* (2022.01)
*H04L 67/1097* (2022.01)
(52) U.S. Cl.
CPC .......... *H04L 63/083* (2013.01); *H04L 63/166* (2013.01); *H04L 67/1097* (2013.01)

(58) Field of Classification Search
CPC .. H04L 63/083; H04L 63/166; H04L 67/1097
See application file for complete search history.

(56) References Cited

U.S. PATENT DOCUMENTS

| | | | | | |
|---|---|---|---|---|---|
| 8,108,912 | B2 * | 1/2012 | Ferris | .................... | G06F 21/604 |
| | | | | | 709/201 |
| 2008/0043696 | A1 * | 2/2008 | Yang | .................. | G06F 21/6245 |
| | | | | | 370/341 |
| 2012/0096121 | A1 * | 4/2012 | Hao | .................... | H04L 67/1074 |
| | | | | | 709/219 |
| 2012/0278728 | A1 * | 11/2012 | Malin | .............. | H04N 21/44209 |
| | | | | | 709/217 |
| 2014/0304764 | A1 * | 10/2014 | Banerjee | ................ | H04L 63/02 |
| | | | | | 726/1 |

* cited by examiner

*Primary Examiner* — Viet D Vu
(74) *Attorney, Agent, or Firm* — Fountainhead Law Group, PC

(57) ABSTRACT

Techniques for enabling the retrieval of data blobs by a network management system from an on-premises network are provided. In certain embodiments, these techniques leverage external storage (i.e., storage that resides outside of the on-premises network) to enable this data blob retrieval in a secure, efficient, and scalable manner.

20 Claims, 5 Drawing Sheets

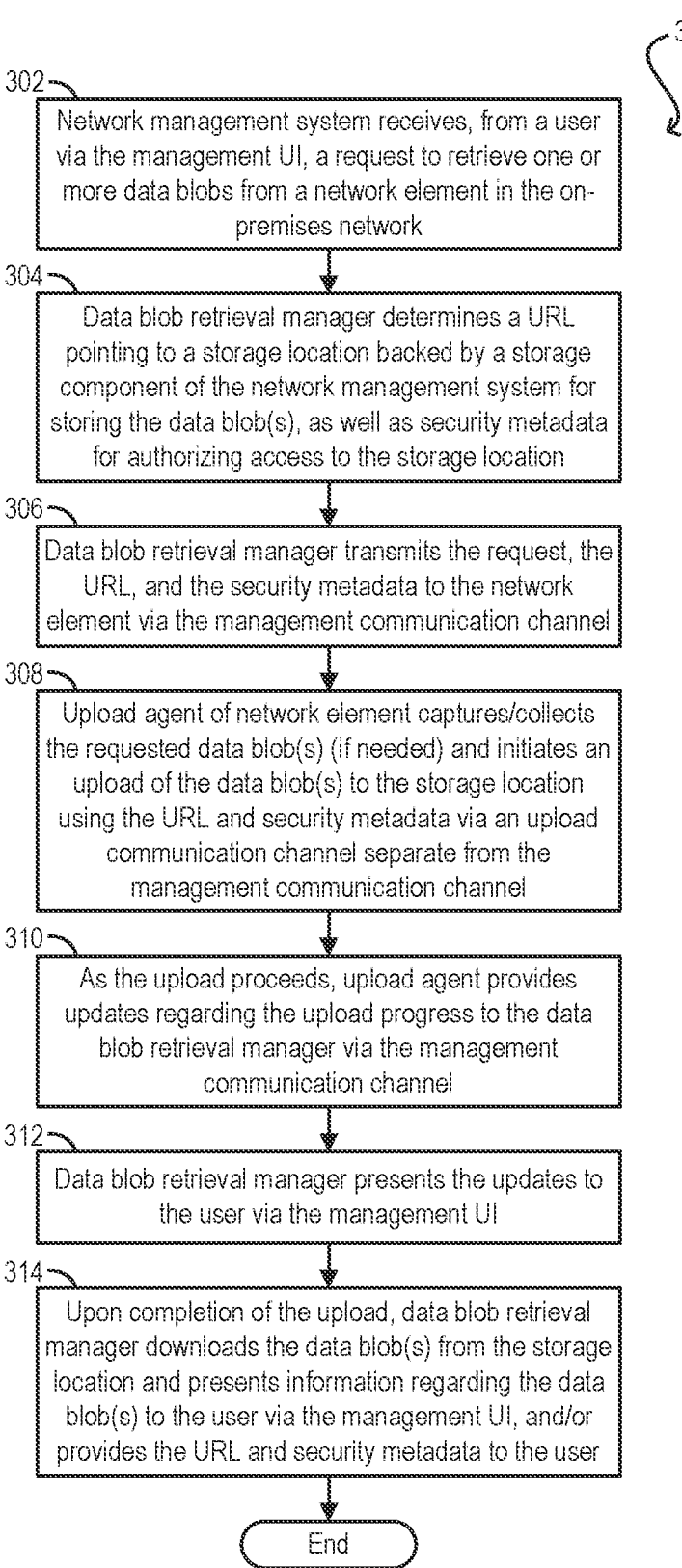

302 — Network management system receives, from a user via the management UI, a request to retrieve one or more data blobs from a network element in the on-premises network 304 — Data blob retrieval manager determines a URL pointing to a storage location backed by a storage component of the network management system for storing the data blob(s), as well as security metadata for authorizing access to the storage location 306 — Data blob retrieval manager transmits the request, the URL, and the security metadata to the network element via the management communication channel 308 — Upload agent of network element captures/collects the requested data blob(s) (if needed) and initiates an upload of the data blob(s) to the storage location using the URL and security metadata via an upload communication channel separate from the management communication channel 310 — As the upload proceeds, upload agent provides updates regarding the upload progress to the data blob retrieval manager via the management communication channel 312 — Data blob retrieval manager presents the updates to the user via the management UI 314 — Upon completion of the upload, data blob retrieval manager downloads the data blob(s) from the storage location and presents information regarding the data blob(s) to the user via the management UI, and/or provides the URL and security metadata to the user End

*FIG. 3*

CROSS-DOMAIN DATA BLOB RETRIEVAL FOR ON-PREMISES NETWORKS

BACKGROUND

Network management systems provide centralized management, configuration, and monitoring of computer networks. In some cases, a user of a network management system may wish to retrieve a large amount of data in the form of one or more data blobs (binary large objects) from a network that is managed by the system. However, there are various challenges with enabling this data blob retrieval if the network is an on-premises network (i.e., a network that physically resides within the facilities of an organization) and the network management system runs at a location external to that on-premises network (e.g., in the cloud).

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 depicts a data blob retrieval workflow in accordance with certain embodiments of the present disclosure.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

Embodiments of the present disclosure are directed to a framework for enabling the retrieval of data blobs by a network management system from an on-premises network. In certain embodiments, the framework leverages external storage (i.e., storage that resides outside of the on-premises network) to enable this data blob retrieval in a secure, efficient, and scalable manner.

1. Example Environment and Solution Overview

Figure 1:
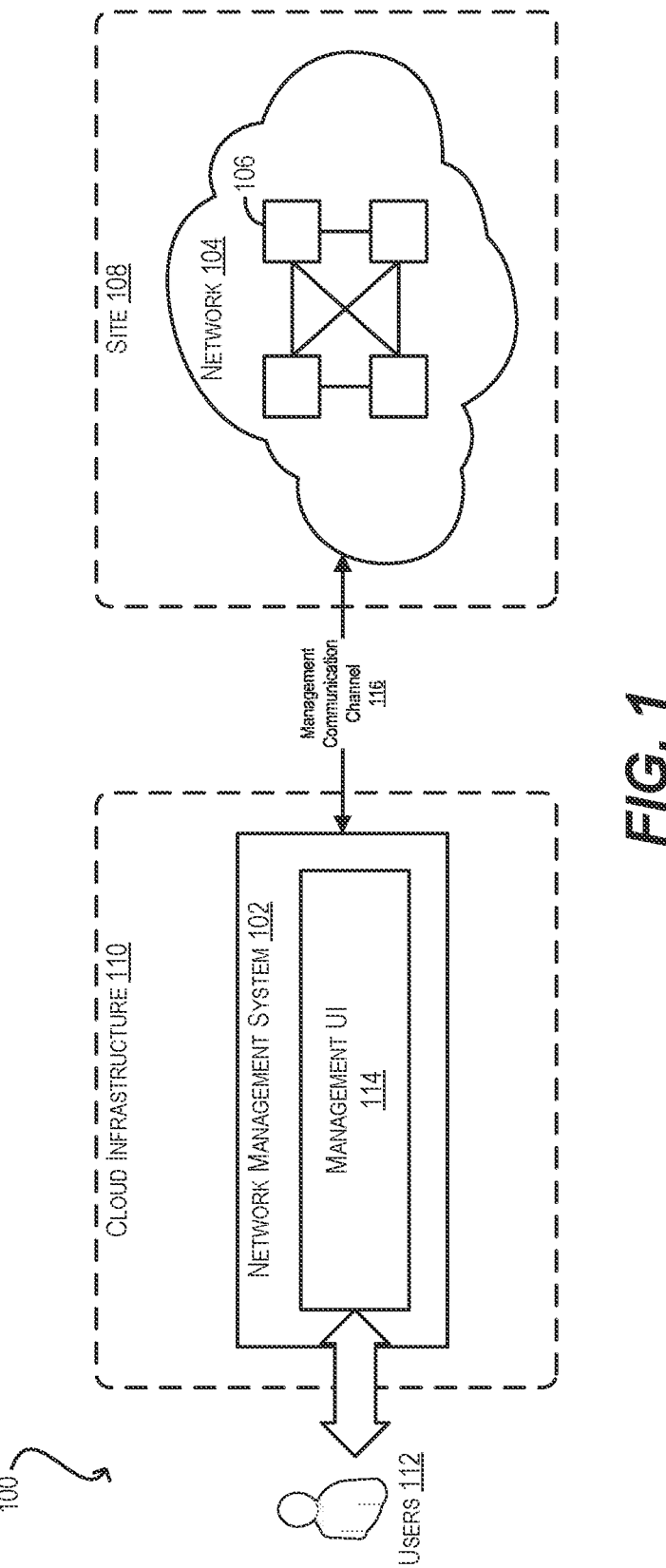
FIG. 1 depicts an example environment in accordance with certain embodiments of the present disclosure.

FIG. 1 is a simplified block diagram of an example environment 100 in which the framework of the present disclosure may be implemented. As shown, environment

100 includes a network management system 102 that is communicatively coupled with a network 104 comprising a plurality of network elements 106 (e.g., switches, routers, access points (AP), recorder nodes, analysis nodes, etc.). In this example, network 104 resides at a site 108 owned/operated by a hypothetical organization O and thus is an on-premises network of O. For instance, site 108 may be a data center of organization O and network 104 (hereinafter referred to as on-premises network 104) may be a network within that data center. In contrast, network management system 102 runs on a cloud infrastructure 110 that is external to, or in other words is in a different network security domain than, on-premises network 104. For instance, cloud infrastructure 110 may be a public cloud infrastructure such as Amazon AWS, Microsoft Azure, Google Cloud, or the like. Alternatively, cloud infrastructure 110 may be a private cloud infrastructure that is owned by another organization.

In operation, network management system 102 allows a set of users 112 operating client devices (not shown) to centrally monitor, manage, and maintain on-premises network 104 and its constituent network elements 106 via a management user interface (UI) 114. For example, management UI 114 can present information regarding the configuration/statuses of network elements 106 and provide user controls for performing various management tasks with respect to the network elements, such as changing their configured settings, initiating troubleshooting workflows, and so on. Network management system 102 also maintains a bi-directional management communication channel 116 with each network element 106 in on-premises network 104 that is managed by the system for transmitting and receiving various types of management traffic (e.g., status information, commands, etc.) to and from that network element. For example, at the time a given network element 106 of on-premises network 104 is on-boarded for management via network management system 102, the network element can initiate the creation of management communication channel 116 by sending a request to system 102. Various techniques can be used to authenticate the network element (e.g., one-time token, password, etc.) as part of this channel creation process.

As mentioned in the Background section, in some cases a user of a network management system may wish to use the system to retrieve one or more data blobs from one or more network elements in a managed network. As used herein, a data blob refers to any collection of binary data. For example, the user may be an administrator of the managed network and may wish to retrieve via the network management system a packet capture file created by a recorder node to troubleshoot a network problem. Alternatively, the user may wish to retrieve disk images, support bundles, data logs, etc.

However, there are several challenges with enabling this data blob retrieval if the managed network is an on-premises network and the network management system operates outside of that on-premises network, as per the example of FIG. 1. First, because an on-premises network is a private network that is secured from external access, the network management system cannot initiate, via a communication channel different from management communication channel 116, a download of data blobs from the on-premises network. One workaround for this limitation is for an administrator of the on-premises network to open a port in the network's firewall to allow such downloads, but many organizations prefer not to do this for security reasons. Another workaround is for the network management system to download the data blobs over management communication channel 116. However, this approach is inefficient as it requires the data blobs to be serialized in a protocol specific representation used by management communication channel 116 and can interfere with the timely delivery of management traffic. This approach is also undesirable from a design standpoint because management communication channel 116 is intended/suited to only carry management traffic.

Second, even if the network management system could directly download data blobs from the on-premises network in a secure and efficient fashion, in some scenarios those data blobs may need to be accessible for a significant period of time, for example to allow users to retrieve them again for further analysis or troubleshooting. Alternatively or in addition, the data blobs may need to be retrieved by many different users. In either of these scenarios, the network element hosting the data blobs will be burdened with extra storage and/or compute overhead that may negatively impact its operation.

Figure 2:
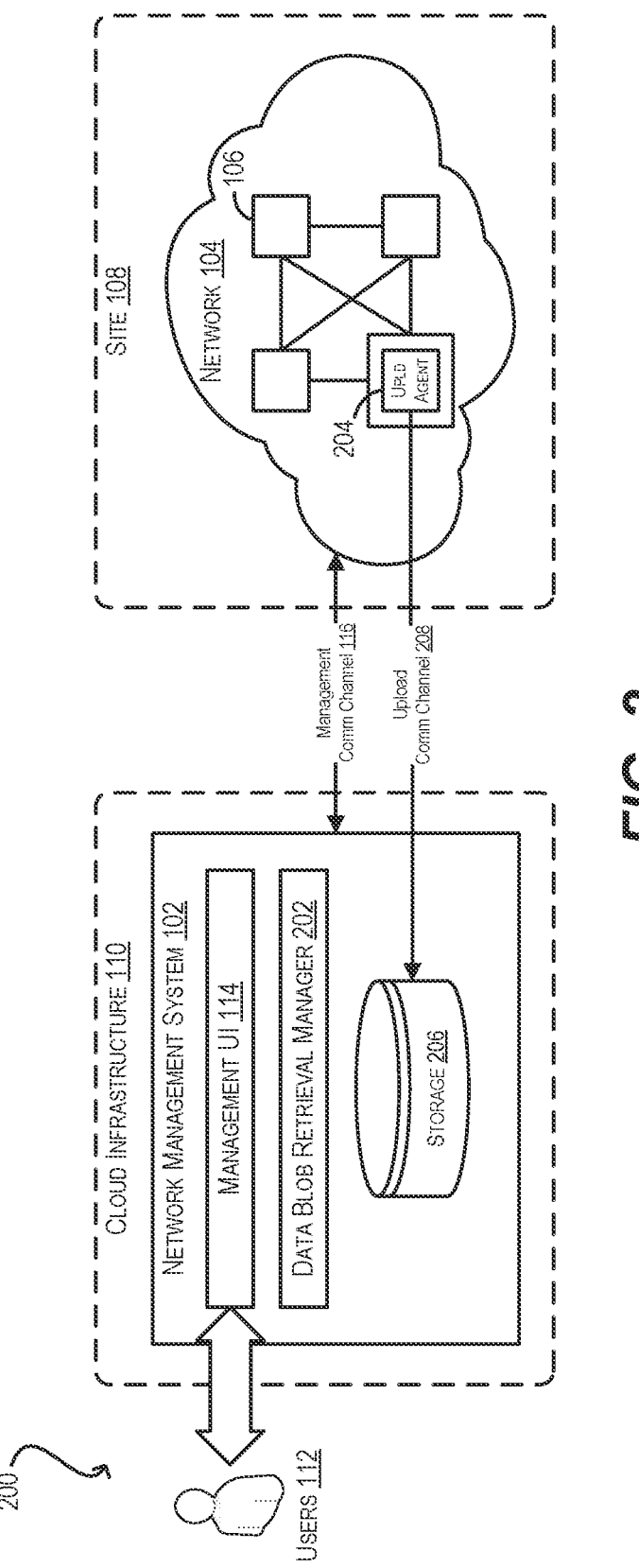
FIG. 2 depicts another example environment in accordance with certain embodiments of the present disclosure.

To address the foregoing and other related issues, FIG. 2 depicts a modified version 200 of environment 100 of FIG. 1 that implements a novel data blob retrieval framework according to certain embodiments. As shown, this framework comprises a data blob retrieval manager 202 in network management system 102 and an upload agent 204 in each network element 106 of on-premises network 104 that is intended to support the framework. Data blob retrieval manager 202 and upload agents 204 may be implemented in software, in hardware, or a combination thereof. The framework also includes a storage component 206 that is external to, but accessible by, on-premises network 104. For example, in FIG. 2 this storage component is a part of network management system 102.

As explained in further detail below, in response to a user request to retrieve, via network management system 102, one or more data blobs from a network element 106 in on-premises network 104, the framework can enable the network element to securely upload the data blob(s) to a storage location in storage 206 via an upload communication channel 208 that is different from, or out-of-band with respect to, management communication channel 116. For example, the framework may provide the network element with a link (e.g., uniform resource locator (URL)) to the storage location, along with security metadata that authorizes the network element to upload data to the storage location using the link.

Upon completion of the upload, network management system 102 can retrieve the data blob(s) from the storage location in storage 206, post-process the data blob(s) in some manner (e.g., summarize or tabulate the information contained therein), and present the resulting information to the requesting user via management UI 114. Alternatively or in addition, network management system 102 can provide the requesting user with the link and appropriate security metadata (which may be different from the security metadata provided to the network element) so that the user can directly download the data blob(s) from storage 206.

With the general framework and approach described above, a number of benefits are realized. First, because the framework changes the data blob retrieval paradigm from (1) a download initiated by network management system 102 with respect to data blobs hosted within on-premises network 104 to (2) an upload initiated by on-premises network 104 to an external and publicly accessible storage location, there is no need to modify the network configuration of on-premises network 104 (e.g., open ports in the network firewall, setup network address translation (NAT), etc.) or to repurpose management communication channel

116 for data blob transfers. Accordingly, this framework provides a more secure, efficient, and elegant solution than alternative approaches. In some embodiments, as the data blob upload process is proceeding, the network element performing the upload can leverage management communication channel 116 to provide status updates regarding the upload to the requesting user via management UI 114.

Second, because the requested data blob(s) are uploaded to and held in storage 206 outside of on-premises network 104 (rather than being hosted on one of its network elements 106), the framework is highly scalable. For example, if multiple users request the same data blob, that data blob can be uploaded once to storage 206 and downloaded by the users from there, rather than requiring multiple redundant downloads from on-premises network 104. Further, if a requested data blob needs to remain retrievable for a significant period of time, the data blob can simply be held at its uploaded location in storage 206 for as long as needed, without incurring any additional overhead on the network element it originated from.

It should be appreciated that FIGS. 1 and 2 and the foregoing description are illustrative and not intended to limit embodiments of the present disclosure. For example, although storage 206 is shown as being a part of network management system 102, in other embodiments this storage may be provided by a third-party storage service (e.g., Amazon S3, Azure blob storage, etc.) that is separate/distinct from network management system 102.

Further, although the foregoing description assumes that network management system 102 runs at a location that is external to on-premises network 104, this is merely to highlight the challenges of enabling data blob retrieval in such a scenario and is not strictly required. To provide a generic data blob retrieval solution that applies to all types of managed networks, network management system 102 may employ the framework of the present disclosure with respect to any network managed by the system, regardless of whether system 102 runs within the security domain of that network or not.

2. Data Blob Retrieval Workflow

FIG. 3 depicts workflow 300 that may be executed by network management system 102 of FIG. 2 using framework components 202-206 for enabling data blob retrieval from on-premises network 104 according to certain embodiments.

Starting with step 302, network management system 102 can receive, from a user 112 via management UI 114, a request to retrieve one or more data blobs from a network element 106 of on-premises network 104. For example, the requested data blob(s) may include information needed by the user for troubleshooting a network problem in on-premises network 104, such as the results of a packet capture query (e.g., PCAP file). The requested data blob(s) may also include other types of information pertaining to the operation and/or configuration of network element 106, such as a core file, a configuration file, or a log file of the network element. The network element itself may be a switch, a router, an AP, a monitoring fabric node (e.g., recorder node, analysis node, etc.), or the like.

At step 304, data blob retrieval manager 202 of network management system 102 can determine a URL pointing to a storage location backed by storage 206 for storing the requested data blob(s), as well as security (e.g., authorization and/or authentication) metadata for allowing/authorizing the network element to upload the data blob(s) to the storage location via the URL. The specific properties of the URL and the security metadata may vary depending on the implementation/deployment. For example, in one set of embodiments the security metadata may be separate from the URL and may take the form of a token, certificate, cookie, or the like. In other embodiments, the security metadata may be embedded in the URL (e.g., in the case of a signed URL).

Further, in certain embodiments the URL may be valid only for a preconfigured time window (e.g., one hour), such that no data can be uploaded to or downloaded from the storage location using the URL after that window has expired.

Yet further, in cases where network management system 102 is a multi-tenant system that is used by multiple organizations, the URL and/or security metadata may be specific to the organization to which requesting user 112 belongs (i.e., organization O), such that the storage location is isolated from, and thus cannot be accessed by, other tenants.

At step 306, data blob retrieval manager 202 can transmit the data blob request, the URL, and the security metadata to network element 106 via management communication channel 116. In response, upload agent 204 of network element 106 can receive this information, capture/collect the requested data blob(s) (if it has not yet done so already) within an internal storage component of the network element, and initiate an upload of the data blob(s) from the internal storage component to the storage location using the URL and security metadata (step 308). As mentioned previously, this upload is performed directly to storage 206 via upload communication channel 208, which is separate from management communication channel 116.

As the upload of the data blob(s) is proceeding, upload agent 204 can monitor its progress and provide, via management communication channel 116, updates regarding that progress to data blob retrieval manager 202 (step 310). These updates can include, e.g., the amount of data that has been uploaded, the amount of data remaining to be uploaded, the estimated time remaining until upload completion, and so on. Manager 202 can present these updates in real-time or near real-time to user 112 via management UI 114 (step 312).

Finally, upon completion of the upload, data blob retrieval manager 202 can download the data blob(s) from its storage location in storage 206 and present information regarding the data blob(s) to user 112 via management UI 114, and/or can provide the URL and appropriate security metadata to user 112 so that the user can download the data blob(s) themselves (step 312). Typically, the security metadata provided to the user at this step will be different from the security metadata provided to the network element at step 306. For example, the security metadata provided to the network element may only authorize the writing of data to the storage location, while the security metadata provided to the user may only authorize the reading of data from the storage location.

Although not shown in the figure, data blob retrieval manager 202 can also provide the URL and (read-only) security metadata to other users of network management system 102 that subsequently request the same data blob(s), thereby avoiding the need for network element 106 to reupload the data blob(s) in response to multiple identical requests. The user(s) can then use the URL and security metadata to download the data blob(s) from storage 206 as many times as needed, until the URL expires (if the URL is subject to such a constraint).

It should be appreciated that workflow 300 is illustrative and various modifications are possible. For example, in some embodiments the requested data blob(s) may reside on multiple network elements in on-premises network 104, rather than on a single network element. In these embodiments, data blob retrieval manager 202 can determine and provide a separate storage URL and corresponding security metadata to each such network element. In response, the network elements can upload their data blob(s) to storage 206 using their respective URLs/security metadata and provide upload status updates to data blob retrieval manager 202 via management communication channel 116. Finally, once all of the network elements have completed their uploads, data blob retrieval manager 202 can consolidate the uploaded data blobs into a single storage location in storage 206 and provide a URL to that consolidated storage location to the requesting user, thereby allowing the user to download all of the uploaded information via a single link.

Further, in some embodiments the requested data blob(s) may pertain to a subset of the data maintained by network element 106 within its internal storage component or may be requested in a format that is different from the format in which network element 106 stores data in the internal storage component. For example, in the case where network element 106 is a recorder node, the data blob request may be a request for a subset of the packet capture information collected by the recorder node, per certain specified criteria (e.g., IP address, time window, etc.). In these embodiments, as part of the processing performed at step 308, upload agent 204 may filter, transform, or otherwise modify the data held in its internal storage component in order to construct the data blob(s) in accordance with the user request, prior to uploading those data blob(s) to the storage location. Alternatively, upload agent 204 may upload data for the requested data blob(s) in a "raw" format (i.e., the format in which the data in stored on the network element) and once the upload is complete, data blob retrieval manager 202 may convert the uploaded data into a format expected by the requesting user.

3. Example Network Device

Figure 4:
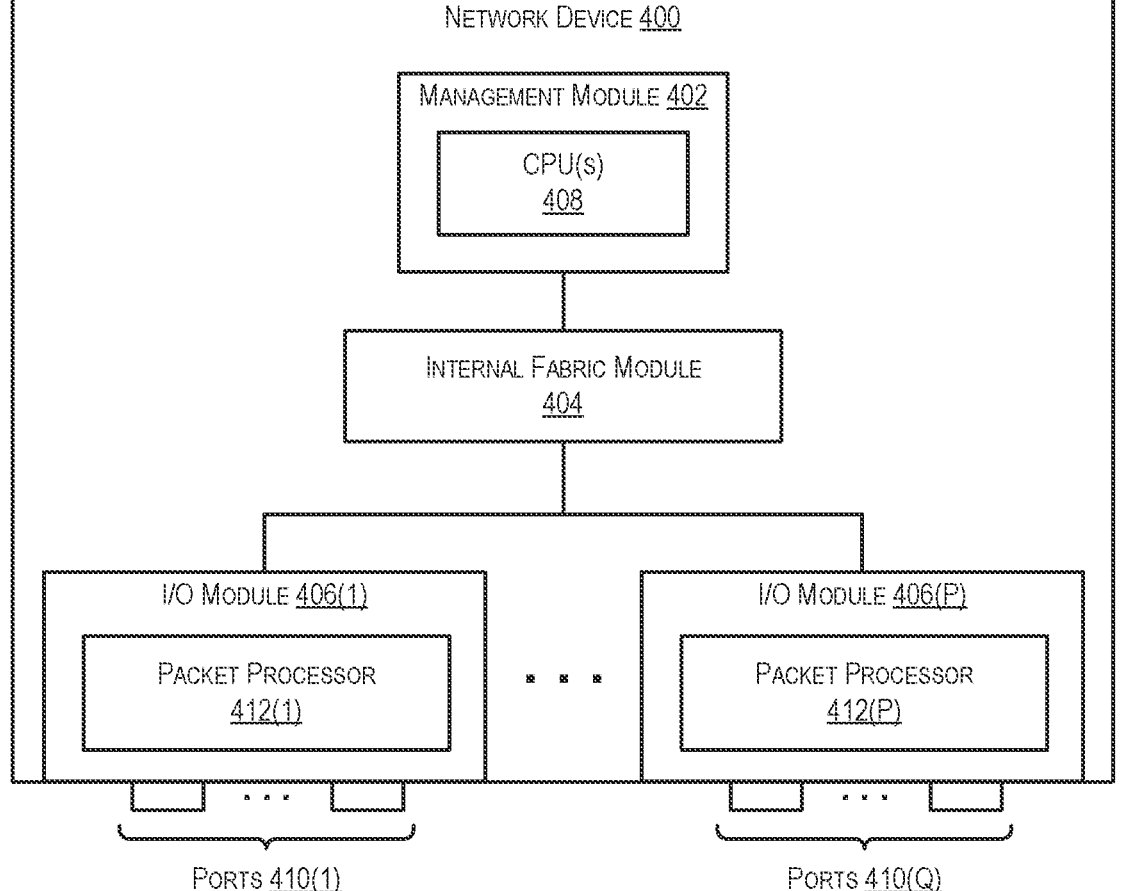
FIG. 4 depicts an example network device in accordance with certain embodiments of the present disclosure.

FIG. 4 depicts an example network device 400 according to certain embodiments of the present disclosure. Network device 400 may correspond to one or more of the network elements in on-premises network 104 of FIGS. 1 and 2.

As shown in FIG. 4, network device 400 includes a management module 402, an internal fabric module 404, and a number of I/O modules 406(1)-(P). Management module 402 includes one or more management CPUs 408 for managing/controlling the operation of the device. Each management CPU 408 can be a general-purpose processor, such as an Intel/AMD x86 or ARM-based processor, that operates under the control of software stored in an associated memory (not shown). In certain embodiments, management CPU(s) 408 may run upload agent 202 shown in FIG. 2.

Internal fabric module 404 and I/O modules 406(1)-(P) collectively represent the data or forwarding plane of network device 400. Internal fabric module 404 is configured to interconnect the various other modules of network device 400. Each I/O module 406 includes one or more input/output ports 410(1)-(Q) that are used by network device 400 to send and receive network packets. Each I/O module 406(1)-(P) can also include a packet processor 412 that is configured to make wire speed decisions on how to handle incoming or outgoing network packets.

It should be appreciated that network device 400 is illustrative and many other configurations having more or fewer components than network device 400 are possible.

4. Example Computer System

Figure 5:
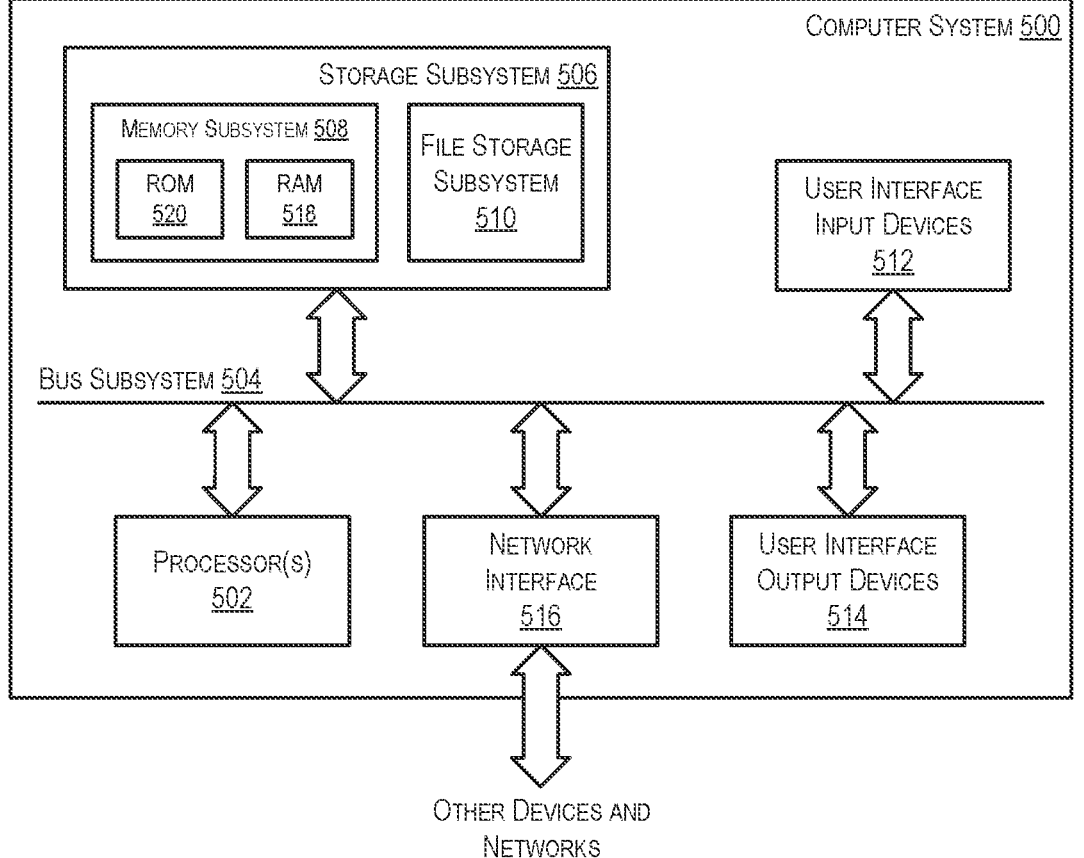
FIG. 5 depicts an example computer system in accordance with certain embodiments of the present disclosure.

FIG. 5 depicts an example computer system 500 according to certain embodiments of the present disclosure. Computer system 500 (or a cluster of such systems) may be used to run some or all of the components of network management system 102 of FIGS. 1 and 2, including data blob retrieval manager 204 and storage service 206.

As shown in FIG. 5, computer system 500 includes one or more CPUs 502 that communicate with a number of peripheral devices via a bus subsystem 504. These peripheral devices include a storage subsystem 506 (comprising a memory subsystem 508 and a file storage subsystem 510), user interface input devices 512, user interface output devices 514, and a network interface subsystem 516.

Bus subsystem 504 provides a mechanism for letting the various components and subsystems of computer system 500 communicate with each other as intended. Although bus subsystem 504 is shown schematically as a single bus, alternative embodiments of the bus subsystem can utilize multiple buses.

Network interface subsystem 516 serves as an interface for communicating data between computer system 500 and other computing devices or networks. Embodiments of network interface subsystem 516 can include wired (e.g., coaxial, twisted pair, or fiber optic) and/or wireless (e.g., Wi-Fi, cellular, Bluetooth, etc.) interfaces.

User interface input devices 512 can include a keyboard, pointing devices (e.g., mouse, trackball, touchpad, etc.), a scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 500.

User interface output devices 514 can include a display subsystem such as a flat-panel display or non-visual displays such as audio output devices, etc. In general, use of the term "output device" is intended to include all possible types of devices and mechanisms for outputting information from computer system 500.

Storage subsystem 506 includes a memory subsystem 508 and a file/disk storage subsystem 510. Subsystems 508 and 510 represent non-transitory computer-readable storage media that can store, in a non-transitory state, program code and/or data that provide the functionality of various embodiments described herein.

Memory subsystem 508 includes a number of memories including a main random-access memory (RAM) 518 for storage of instructions and data during program execution and a read-only memory (ROM) 520 in which fixed instructions may be stored. File storage subsystem 510 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than computer system 500 are possible.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network management system that is configured to manage an on-premises network, the method comprising:

receiving, from a user via a management user interface (UI) of the network management system, a request to retrieve a data blob from a network element in the on-premises network;

determining a uniform resource locator (URL) to a storage location for storing the data blob and security metadata enabling access to the storage location, the storage location being backed by storage that is external to the on-premises network;

embedding the security metadata into the URL;

transmitting, via a management communication channel between the network management system and the network element, the request and the URL, with the embedded security metadata to the network element;

while an upload of the data blob initiated by the network device to the storage location is proceeding:

receiving, via the management communication channel, one or more status updates from the network element, the one or more status updates pertaining to progress of the upload of the data blob; and presenting, via the management UI, the one or more status updates to the user; and upon determining that the upload of the data blob is complete, taking one or more actions.

2. The method of claim 1 wherein the one or more actions comprise:

downloading the data blob from the storage location; and presenting, via the management UI, information regarding the data blob to the user.

3. The method of claim 1 wherein the one or more actions comprise providing the URL and the security metadata to the user.

4. The method of claim 3 wherein the one or more actions further comprise providing the URL and the security metadata to one or more other users that also request the data blob.

5. The method of claim 1 wherein the upload of the data blob is performed via a communication channel that is separate from the management communication channel.

6. The method of claim 1 wherein the network management system runs at a location that is external to the on-premises network.

7. The method of claim 1 wherein the storage is a component of the network management system.

8. The method of claim 7 wherein the network management system ensures that the storage is isolated on a per-tenant basis.

9. The method of claim 1 wherein the storage is provided by a storage service that is separate from the network management system.

10. The method of claim 1 wherein the data blob comprises information relevant for troubleshooting a network problem in the on-premises network or information pertaining to operation or configuration of the network element.

11. The method of claim 1 wherein the network element is a recorder node and wherein the data blob comprises packet capture information collected by the recorder node.

12. The method of claim 1 wherein the URL is valid for a preconfigured time window, such that no data can be uploaded to or downloaded from the storage location after the time window has expired.

13. A computer system implementing a network management system, the computer system comprising:

a processor; and a computer-readable storage medium having stored thereon program code that, when executed by the processor, causes the processor to:

receive, from a user via a management user interface (UI) of the network management system, a request to retrieve data blobs from a plurality of network elements in an on-premises network; and for each network element in the plurality of network elements:

determine a uniform resource locator (URL) to a storage location for storing the data blob held by the network element and security metadata enabling access to the storage location, the storage location being backed by storage that is external to the on-premises network;

embed the security metadata into the URL;

transmit, via a management communication channel between the network management system and the network element, the request and the URL, with the embedded security metadata to the network element; and while an upload of the data blob initiated by the network device to the storage location is proceeding:

receive, via the management communication channel, one or more status updates from the network element, the one or more status updates pertaining to progress of the upload of the data blob; and present, via the management UI, the one or more status updates to the user.

14. The computer system of claim 13 the program code further causes the processor to, upon determining that the uploads of the data blobs by the plurality of network elements is complete:

consolidate the data blobs into a single storage location in the storage; and provide a URL pointing to the single storage location to the user.

15. The computer system of claim 13 wherein the network management system runs at a location that is external to the on-premises network.

16. The computer system of claim 13 wherein the storage is a component of the network management system.

17. A method performed by a network management system that is configured to manage a network, the method comprising:

receiving a request to retrieve a data blob from a network element in the network;

determining a link to a storage location for storing the data blob and security metadata enabling access to the storage location, the storage location being backed by storage that is external to the network;

embedding the security metadata into the link;

transmitting, via a management communication channel between the network management system and the network element, the request and the link with the embedded security metadata to the network element; and while an upload of the data blob initiated by the network device to the storage location is proceeding, receiving, via the management communication channel, one or more status updates from the network element, the one or more status updates pertaining to progress of the upload of the data blob.

18. The method of claim 17 wherein the network management system and the network are part of different network security domains.

19. The method of claim 17 wherein the network management system and the network are part of a single network security domain.

20. The method of claim 17 wherein the network is an on-premises network of an organization and the network management system runs at a location that is external to the on-premises network.

* * * * *